United States Patent
Bhagwat et al.

(10) Patent No.: US 10,592,479 B2
(45) Date of Patent: *Mar. 17, 2020

(54) SPACE MANAGEMENT FOR A HIERARCHICAL SET OF FILE SYSTEMS

(71) Applicant: International Business Machines Corporation, Armonk, NY (US)

(72) Inventors: Deepavali M. Bhagwat, Cupertino, CA (US); Marc Eshel, Morgan Hill, CA (US); Dean Hildebrand, Bellingham, WA (US); Manoj P. Naik, San Jose, CA (US); Wayne A. Sawdon, San Jose, CA (US); Frank B. Schmuck, Campbell, CA (US); Renu Tewari, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,663

(22) Filed: Jan. 3, 2017

(65) Prior Publication Data

US 2018/0189319 A1    Jul. 5, 2018

(51) Int. Cl.
*G06F 16/185*    (2019.01)
*G06F 16/11*    (2019.01)

(52) U.S. Cl.
CPC .......... *G06F 16/185* (2019.01); *G06F 16/122* (2019.01)

(58) Field of Classification Search
CPC ......... G06F 17/30221; G06F 17/30091; G06F 17/30138; G06F 16/122; G06F 16/185; G06F 16/1748; G06F 11/00
See application file for complete search history.

(56) References Cited

U.S. PATENT DOCUMENTS

| | | |
|---|---|---|
| 5,603,019 A | 2/1997 | Kish et al. |
| 7,165,079 B1 | 1/2007 | Chen et al. |
| 7,483,906 B2 | 1/2009 | MacCormick et al. |
| 7,574,464 B2 | 8/2009 | Hitz et al. |
| 7,587,436 B2 | 9/2009 | Agetsuma et al. |

(Continued)

FOREIGN PATENT DOCUMENTS

| | | |
|---|---|---|
| EP | 1246061 A2 | 10/2002 |
| EP | 1843245 A1 | 10/2009 |

(Continued)

OTHER PUBLICATIONS

Potter, S. et al., "Reducing downtime due to system maintenance and upgrades", Proceedings of the 19th Conference on Large Installation System Administration Conference (LISA '05), Jan. 2005, pp. 1-17, ResearchGate, United States.

(Continued)

*Primary Examiner* — Jay A Morrison
(74) *Attorney, Agent, or Firm* — Sherman IP LLP; Kenneth L. Sherman; Steven Laut

(57) ABSTRACT

One embodiment provides a method for storage management in a hierarchical file system. The method includes tracking directories for sub-file systems of the hierarchical set of file systems and maintaining a corresponding directory in a top-file system and a number of symbolic pointers in the corresponding directory which each point from the corresponding directory to a sub-file system where any portion of the tracked directory resides. If available space in a first sub-file system is below a threshold, the system identifies a second sub-file system with available space above the threshold, wherein the first sub-file system contains a first portion of the directory. If a second portion of the directory does not exist in the second sub-file system, the system creates the second portion of the directory in the second sub-file system and creates a link from the first portion of the directory to the second portion of the directory.

20 Claims, 9 Drawing Sheets

(56) References Cited

U.S. PATENT DOCUMENTS

| | | | |
|---|---|---|---|
| 7,672,981 B1 | 3/2010 | Faibish et al. | |
| 7,937,421 B2 | 5/2011 | Mikesell et al. | |
| 7,937,453 B1 | 5/2011 | Hayden et al. | |
| 8,131,689 B2 | 3/2012 | Tsirigotis et al. | |
| 8,185,630 B2 | 5/2012 | Pitts | |
| 8,214,404 B2 | 7/2012 | Kazar | |
| 8,296,398 B2 | 10/2012 | Lacapra et al. | |
| 8,332,441 B2 | 12/2012 | Aurora | |
| 8,539,481 B2 | 9/2013 | Smith et al. | |
| 8,694,752 B2 | 4/2014 | Gladwin et al. | |
| 8,886,778 B2 | 11/2014 | Nedved et al. | |
| 9,002,911 B2 | 4/2015 | Anderson et al. | |
| 9,069,779 B2 | 6/2015 | McClanahan et al. | |
| 9,152,642 B2 | 10/2015 | Harrison et al. | |
| 9,207,930 B2 | 12/2015 | Srivas et al. | |
| 9,250,810 B2 | 2/2016 | Coronado et al. | |
| 9,323,763 B2 | 4/2016 | Khandelwal et al. | |
| 9,378,067 B1 | 6/2016 | Agarwala et al. | |
| 9,952,767 B2 | 4/2018 | Zheng et al. | |
| 9,959,335 B2 | 5/2018 | Cho et al. | |
| 10,318,480 B2 | 6/2019 | Dar et al. | |
| 2001/0044795 A1* | 11/2001 | Cohen | G06F 17/30699 |
| 2003/0037034 A1* | 2/2003 | Daniels | G06Q 10/087 |
| 2003/0110190 A1* | 6/2003 | Achiwa | G06F 3/0608 |
| 2003/0115218 A1* | 6/2003 | Bobbitt | G06F 17/30233 |
| 2004/0111390 A1 | 6/2004 | Saito et al. | |
| 2005/0055357 A1* | 3/2005 | Campbell | G06F 8/61 |
| 2006/0074925 A1* | 4/2006 | Bixby | G06F 16/10 |
| 2007/0083482 A1 | 4/2007 | Rathi et al. | |
| 2007/0150492 A1 | 6/2007 | Shitomi et al. | |
| 2008/0201550 A1 | 8/2008 | Bailey | |
| 2009/0006500 A1 | 1/2009 | Shiozawa et al. | |
| 2009/0271442 A1 | 10/2009 | Young et al. | |
| 2009/0271451 A1 | 10/2009 | Young et al. | |
| 2011/0040810 A1* | 2/2011 | Kaplan | G06F 16/11 707/822 |
| 2011/0264635 A1 | 10/2011 | Yang et al. | |
| 2011/0264880 A1 | 10/2011 | Ylonen et al. | |
| 2012/0254269 A1 | 10/2012 | Carmichael | |
| 2013/0166614 A1 | 6/2013 | Watanabe et al. | |
| 2013/0254501 A1 | 9/2013 | Kishi et al. | |
| 2014/0006465 A1 | 1/2014 | Davis et al. | |
| 2014/0156695 A1 | 6/2014 | Callaghan et al. | |
| 2014/0330787 A1 | 11/2014 | Modukuri et al. | |
| 2015/0012567 A1* | 1/2015 | Powell | G06F 17/30079 707/809 |
| 2015/0356109 A1 | 12/2015 | Arikawa et al. | |
| 2015/0363421 A1 | 12/2015 | Bortnikov | |
| 2016/0048606 A1 | 2/2016 | Rubinstein et al. | |
| 2016/0080488 A1 | 3/2016 | Battepati et al. | |
| 2016/0196160 A1 | 7/2016 | Deshpande et al. | |
| 2016/0292443 A1 | 10/2016 | von Muhlen et al. | |
| 2017/0091235 A1 | 3/2017 | Yammine et al. | |
| 2017/0093798 A1* | 3/2017 | McKinion | G06F 16/192 |
| 2018/0018347 A1 | 1/2018 | Yokoi et al. | |
| 2018/0189124 A1 | 7/2018 | Bhagwat | |
| 2018/0189304 A1 | 7/2018 | Bhagwat | |
| 2018/0189305 A1 | 7/2018 | Bhagwat | |
| 2018/0189309 A1 | 7/2018 | Bhagwat | |
| 2018/0189310 A1 | 7/2018 | Bhagwat | |
| 2018/0189318 A1 | 7/2018 | Bhagwat | |
| 2018/0276268 A1 | 9/2018 | Doval et al. | |

FOREIGN PATENT DOCUMENTS

| | | | |
|---|---|---|---|
| WO | 2009005994 A1 | 1/2009 | |
| WO | 2016065229 A3 | 6/2016 | |

OTHER PUBLICATIONS

Watson, R.W., "High Performance Storage System Scalability: Architecture, Implementation and Experience", Proceedings of the 22nd IEEE/ 13th NASA Goddard Conference on Mass Storage Systems and Tecnologies (MSSt'05), Apr. 11-14, 2005, pp. 1-15, IEEE, United States.

Muntz, D., "Building a Single Distributed File System from Many NFS Servers", Hewlett-Packard, Jul. 12, 2001, pp. 1-5, Hewlett-Packard Company, United States.

Mell, P., et al., "The NIST Definition of Cloud Computing", National Institute of Standards and Technology Special Publication 800-145, Sep. 2011, pp. 1-7, U.S. Department of Commerce, United States.

"Inode", Computer Desktop Encyclopedia, The Computer Language Company, retrieved on Dec. 4, 2018 from https://www.computerlanguage.com/results.php?definition=inode (Year: 2018).

"Inode Definition", The Linux Information Project, Published on Sep. 15, 2006, retrieved on Dec. 4, 2018 from http://www.linfo.org/inode.html (Year: 2006).

U.S. Non-Final Office Action for U.S. Appl. No. 15/397,632 dated Sep. 20, 2018.

U.S. Non-Final Office Action for U.S. Appl. No. 15/397,644 dated Sep. 20, 2018.

U.S. Non-Final Office Action for U.S. Appl. No. 15/397,652 dated Sep. 20, 2018.

U.S. Non-Final Office Action for U.S. Appl. No. 15/397,601 dated Jul. 12, 2019.

U.S. Final Office Action for U.S. Appl. No. 15/397,620 dated May 29, 2019.

U.S. Final Office Action for U.S. Appl. No. 15/397,614 dated Jul. 23, 2019.

U.S. Advisory Action for U.S. Appl. No. 15/397,620 dated Jul. 31, 2019.

"What is Dirty Data?", Techopedia, retrieved on Mar. 23, 2019 from https://www.techopedia.com/definition/1194/dirty-data (Year: 2019).

"Dirty Bit", Computer Desktop Encyclopedia, The Computer Language Company Inc., retrieved on Mar. 23, 2019 from https://www.computerlanguage.com/results.php?definition=dirty+bit (Year: 2019).

"Dirty Data", Computer Desktop Encyclopedia, The Computer Language Company Inc., retrieved on Mar. 23, 2019 from https://www.computerlanguage.com/results.php?definition=dirty+data (Year: 2019).

U.S. Final Office Action for U.S. Appl. No. 15/397,632 dated Mar. 7, 2019.

U.S. Final Office Action for U.S. Appl. No. 15/397,644 dated Mar. 7, 2019.

U.S. Non-Final Office Action for U.S. Appl. No. 15/397,614 dated Apr. 8, 2019.

U.S. Final Office Action for U.S. Appl. No. 15/397,652 dated Mar. 7, 2019.

U.S. Advisory Action for U.S. Appl. No. 15/397,632 dated May 10, 2019.

U.S. Advisory Action for U.S. Appl. No. 15/397,644 dated May 10, 2019.

U.S. Advisory Action for U.S. Appl. No. 15/397,652 dated May 10, 2019.

U.S. Non-Final Office Action for U.S. Appl. No. 15/397,620 dated Dec. 17, 2018.

U.S. Non-Final Office Action for U.S. Appl. No. 15/397,632 dated Aug. 23, 2019.

U.S. Non-Final Office Action for U.S. Appl. No. 15/397,644 dated Aug. 19, 2019.

U.S. Advisory Action for U.S. Appl. No. 15/397,614 dated Sep. 13, 2019.

U.S. Non-Final Office Action for U.S. Appl. No. 15/397,652 dated Aug. 19, 2019.

U.S. Notice of Allowance for U.S. Appl. No. 15/397,644 dated Oct. 25, 2019.

U.S. Final Office Action for U.S. Appl. No. 15/397,601 dated Dec. 4, 2019.

U.S. Notice of Allowance for U.S. Appl. No. 15/397,614 dated Jan. 16, 2020.

U.S. Notice of Allowance for U.S. Appl. No. 15/397,632 dated Oct. 23, 2019.

(56) References Cited

OTHER PUBLICATIONS

U.S. Notice of Allowance for U.S. Appl. No. 15/397,620 dated Jan. 9, 2020.
U.S. Notice of Allowance for U.S. Appl. No. 15/397,652 dated Oct. 25, 2019.

* cited by examiner

SPACE MANAGEMENT FOR A HIERARCHICAL SET OF FILE SYSTEMS

BACKGROUND

With storage requirements growing, information technology (IT) departments are expected to maintain and provide for storage in the scale of petabytes. However, as file systems grow, the probability of failures/corruptions, either due to software bugs or hardware failure, increases. Recovery from failures takes longer and longer as more and more data and metadata need to be scanned to verify integrity and correct inconsistencies. Ultimately file system availability and robustness degrades.

SUMMARY

Embodiments relate to storage management in aggregated file systems. One embodiment provides a method for storage management in a hierarchical file system. The method includes tracking directories for sub-file systems of the hierarchical set of file systems and maintaining a corresponding directory in a top-file system and a number of symbolic pointers in the corresponding directory which each point from the corresponding directory to a sub-file system where any portion of the tracked directory resides. If available space in a first sub-file system is below a threshold, the system identifies a second sub-file system with available space above the threshold, wherein the first sub-file system contains a first portion of the directory. If a second portion of the directory does not exist in the second sub-file system, the system creates the second portion of the directory in the second sub-file system and creates a link from the first portion of the directory to the second portion of the directory.

These and other features, aspects and advantages of the present invention will become understood with reference to the following description, appended claims and accompanying figures.

DETAILED DESCRIPTION

Figure 1:
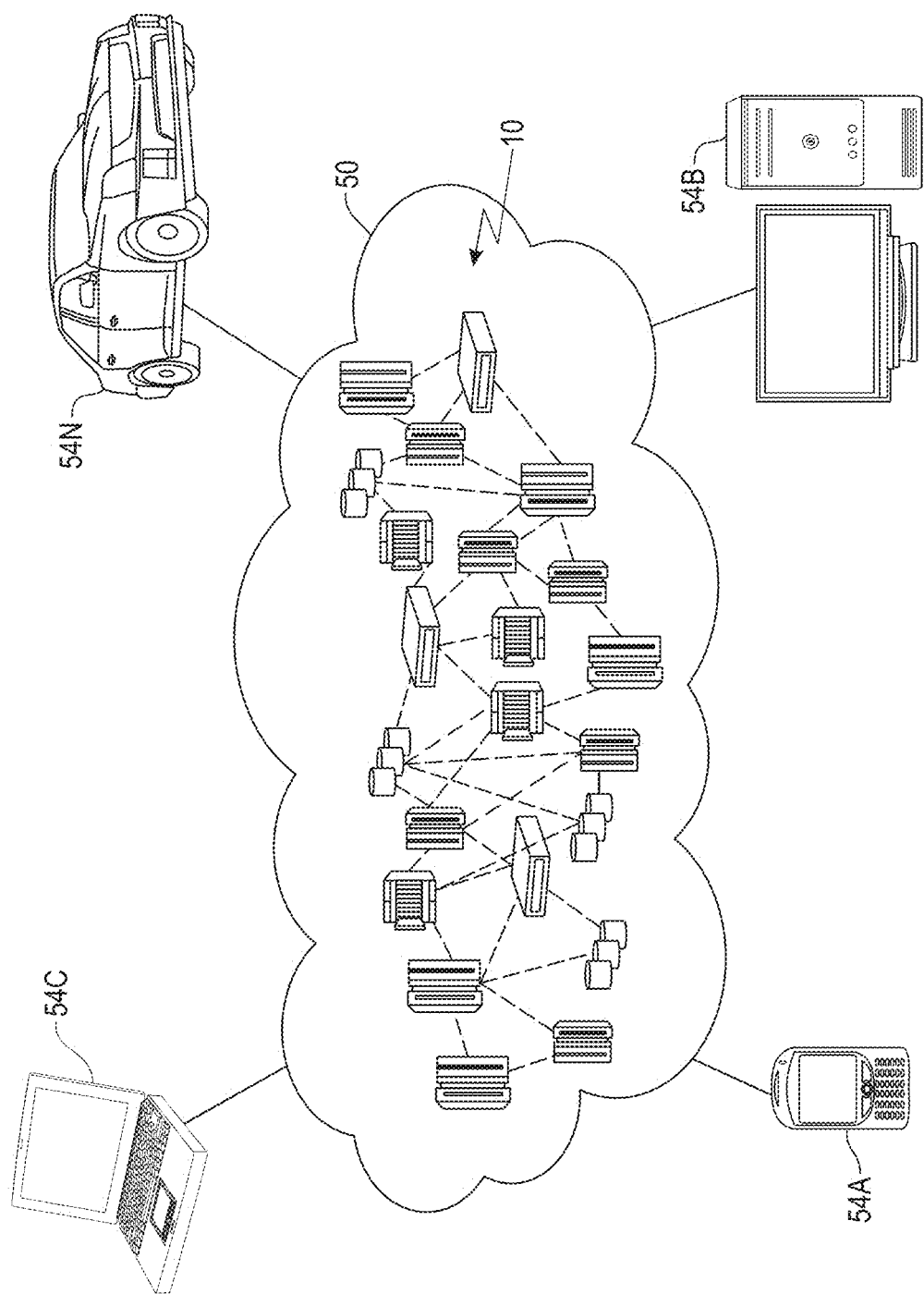
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

One or more embodiments provide for retrospective snapshot creation. One embodiment includes creating, by a processor, a first snapshot that captures logical state of a data store at a first key. Creation of the first snapshot is based on determining a log offset corresponding to the first key, determining existence of a second snapshot that captures logical state of the data store and recording a retrospective snapshot at a last valid log address offset prior to the first key upon a determination that the second snapshot exists based on determining at least one of: whether log address offsets from a first log entry of a log to a log entry of the log at the first key are contiguous and whether log address offsets from the second snapshot to the first key are contiguous.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
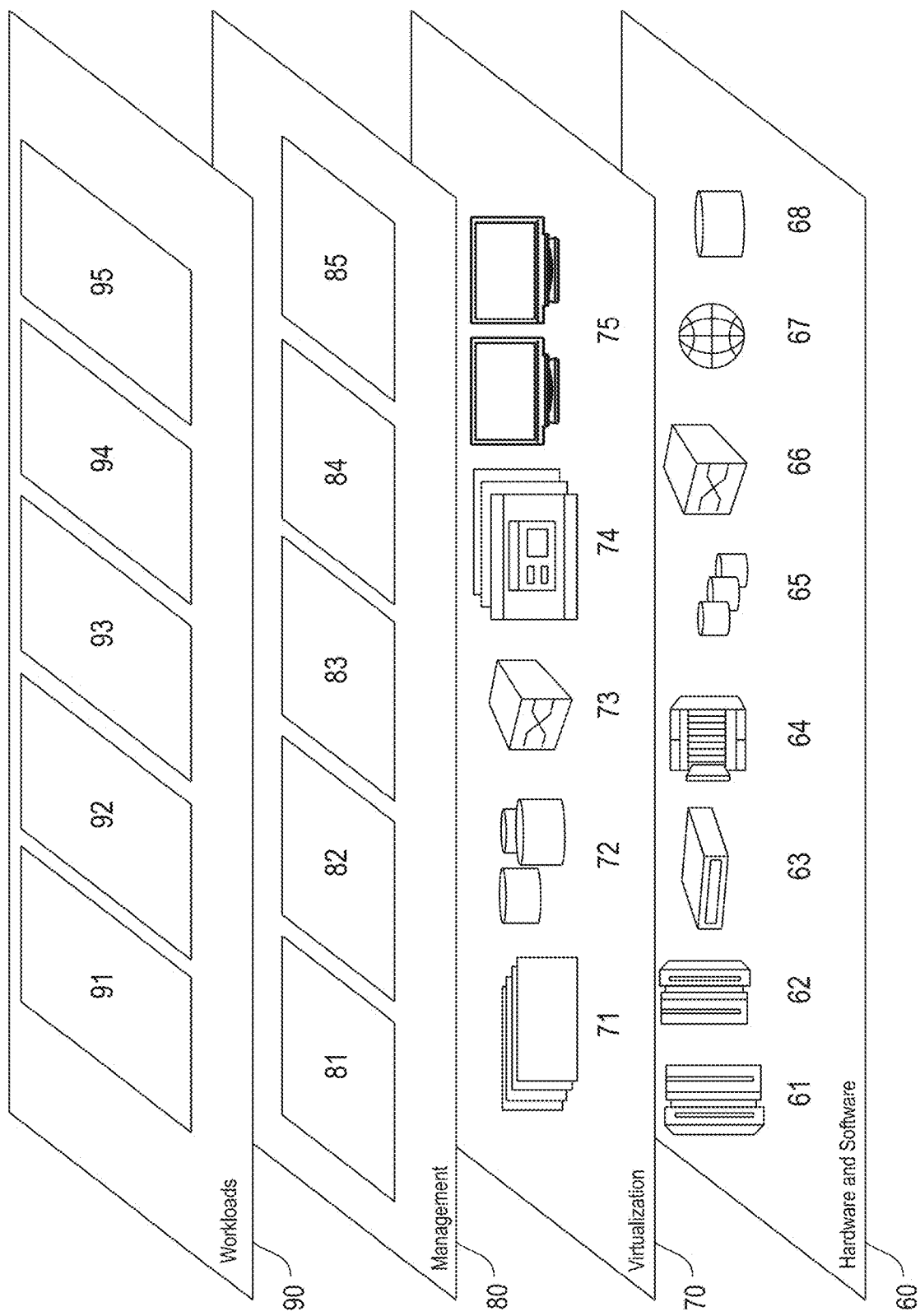
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3) or the autonomous cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
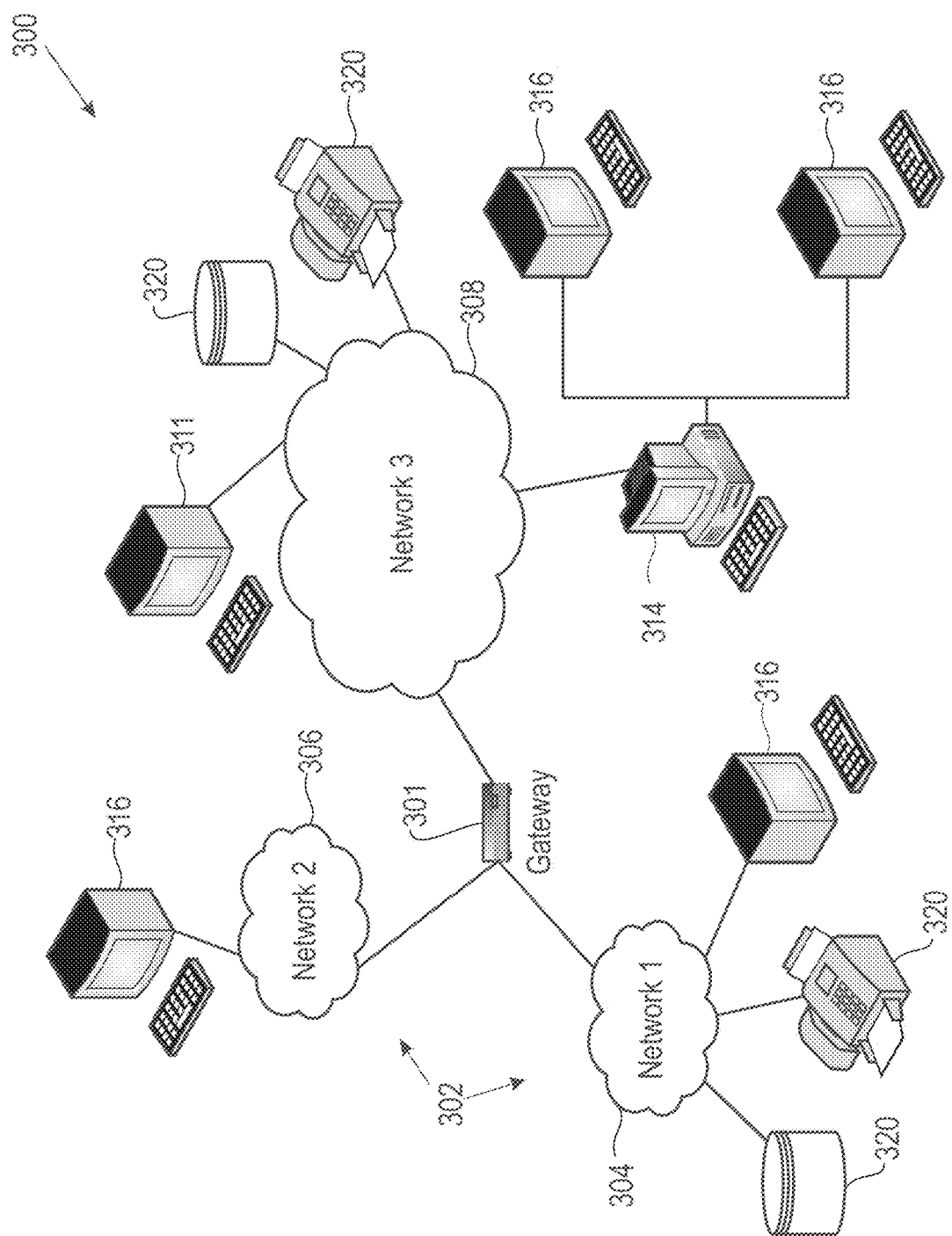
FIG. 3 is a network architecture for storage management providing unique inode numbers across multiple file system namespaces, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
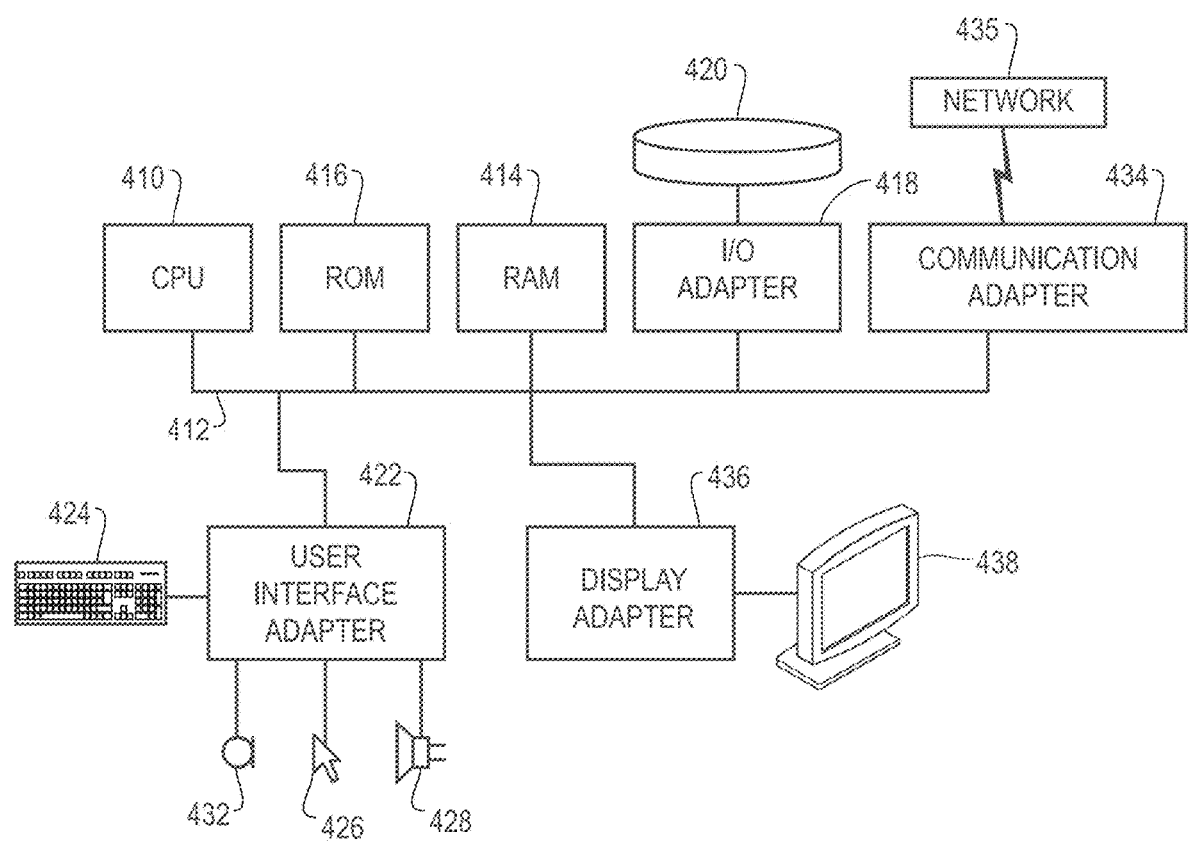
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

An inode may be referred to as a data structure, which may be used to represent a file system object. A file system object may be, for example, a file, a directory, etc. Each inode stores attributes and disk block location(s) for the file system object's data. Integrity checks such as file system consistency check (fsck) have been parallelized using techniques, such as inode space division and node delegation to speed up recovery. However, the time taken to recover/check file systems is still proportional to the volume of data that needs to be scanned. To solve for that, union mount file systems may be used. Instead of a single file system, multiple smaller file systems or sub-file systems (also referred to as subFSs) are commissioned such that together they provide for the cumulative storage needs. Since each sub-file system (also referred to as subFS) is smaller than the whole file system, if there is a failure in a sub-file system, recovery is faster. Each sub-file system is a federated entity, therefore, a failure in one sub-file system does not affect the other sister sub-file systems. This improves availability.

As storage requirements grow, new sub-file systems can be provisioned to distribute the load without degrading recovery time. One key problem with presenting multiple file systems as a single namespace is that each individual file system uses the same set of possible inode numbers. This can cause issues in several different ways. First, applications using the namespace expect that different files will have different inode numbers (this is in fact a core part of the POSIX standard). If two files have the same inode number, many applications could fail. Further, file and directory placement at creation time can be devised to ensure even distribution across all sub-file systems. However, as files grow over time, it is possible for one or some sub-file systems under the union mount point to become too large, increasing recovery time for those sub-file systems in the event of a failure.

Redistribution of data across sub-file systems is required to ensure no one file system grows too large such that it would have a long recovery time if it failed and would handle a disproportionate amount of the incoming I/O load. Therefore, data is moved, along with its inode and namespace, to another sub-file system to rebalance sub-file system size. If inode numbers across sub-file systems weren't unique, such data movement would cause inode collisions in the target sub-file system. Inode number collisions would complicate the machinery which rebalances the spread of data across sub-file systems. One or more embodiments provide a solution that maintains unique inode numbers across all sub-file systems.

Figure 5:
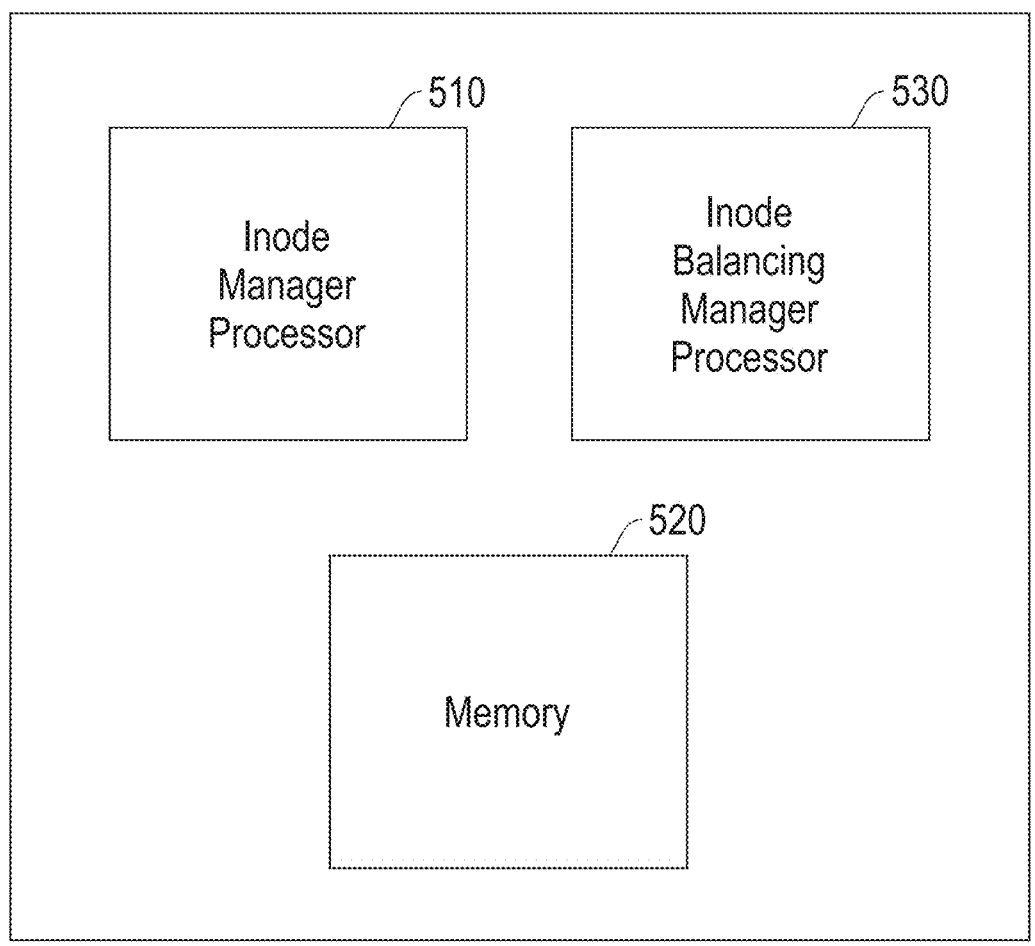
FIG. 5 is a block diagram illustrating processors for storage management providing unique inode numbers across multiple file system namespaces, according to an embodiment.

FIG. 5 is a block diagram illustrating processors for storage management providing unique inode numbers across multiple file system namespaces, according to an embodiment. Node 500 includes an inode manager processor 510, memory 520 and an inode balancing manager processor 530. The memory 520 may be implemented to store instructions and data, where the instructions are executed by the inode manager processor 510 and the inode balancing manager processor 530. In one example, the inode manager processor 510 provides creation of a globally unique inode space across all sub-file systems (e.g., sub-file system 625, FIG. 6). The inode manager processor 510 further provides allocation of a unique range of inodes to every sub-file system. Together these inodes encompass the subtree of the file system. In one or more embodiments, an inode number is unique across all sub-file systems. Therefore, inodes within a cell are unique across all sub-file systems. A cell is an autonomous unit consisting of logical (inodes, hierarchy) and physical (storage pools, allocation table/inode map) constructs.

In one embodiment, the inode balancing manager processor 530 provides balancing and re-balancing processing. In one example, starting with the largest sub-file system by number of inodes or aggregate size, the inode balancing manager processor 530 performs a greedy algorithm to find cells within it. The inode balancing manager processor 530 further quiesces input/output (I/O) operations to every element of the chosen cell, and copies the independent file set's inode table to a destination sub-file system. The inode balancing manager processor 530 notifies a file system allocation manager of a destination sub-file system of the new storage pools that it is required to manage going forward. The inode balancing manager processor 530 further updates any pointers/links in a top-file system (also referred to as a TopFS) to a new location of the cell, un-quiesces I/O to a cell, and performs copy-less creation and deletion of sub-file systems.

In one embodiment, the inode manager processor 510 and the inode balancing manager processor 530 perform processing such that each sub-file system consumes a flexible range of inode numbers from a global inode number pool, therefore ensuring unique inode numbers across all sub-file systems. The inode manager processor acts as a global inode number manager to ensure that each sub-file system has enough inode numbers and that no two sub-file systems have overlapping inode numbers (which would lead to possible data corruption). The top-file system part of the file system (e.g., the portion that binds the sub-file systems together) or the individual sub-file systems send requests to the inode manager processor 510 to request inode numbers (or a range of inodes) to use. The inode manager processor 510 then returns a range of inode numbers. If a sub-file system needs more inode numbers and none are available, the inode manager processor 510 may revoke inode numbers from a sub-file system that doesn't need them and hand them to one that needs it.

In one embodiment, the size of the range of inode numbers is typically limited to the range of inodes that may be described by an unsigned 64 bit binary number. The number of inode numbers provided to each sub-file system is totally under the control of the inode manager processor 510 (although sub-file systems may be able to provide hints to the number that they are requesting). Limiting the number of inode numbers means that sub-file systems will need to send more requests to the inode manager processor 510 (possibly slowing the system down), whereas increasing the number of inode numbers means that a sub-file system could be assigned too many and need to have them revoked (also possibly slowing down the system). In one embodiment, the inode manager processor 510 starts by issuing smaller inode number ranges to each sub-file system. The inode manager processor can then track the sub-file systems to see how often each sub-file system is requesting additional inode numbers, and if the request rate passes a predetermined threshold (e.g., a number of requests per minute, hour, day, etc.), then issue the sub-file system increasingly more inodes in each request to that sub-file system.

In one embodiment, the inode manager processor 510 tracks the inode number ranges assigned to each sub-file system and may be queried by the TopFS (e.g., TopFS 710, FIG. 7) or other daemons in the file system. Each sub-file system may optionally send the inode manager processor 510 an update of the number of used inode numbers. In one example, if a sub-file system requests a range of inode numbers from the inode manager processor 510, but there are no remaining numbers, then the inode manager processor 510 must revoke inode numbers from one of the sub-file systems. If the inode manager processor 510 determines how many inodes are used in each sub-file system (from the sub-file systems sending updates), then the inode manager processor 510 attempts to revoke a portion of the unused inodes from the sub-file system that has the most unused inode numbers. If the inode manager processor 510 does not determine how many of the inode number ranges each of the sub-file systems has used, then it must query all of them to make the determination (this may be performed in parallel). There are several techniques that may be used to revoke an inode number range from one or more sub-file systems (e.g., at small sample size from each one, a large sample size from one sub-file system, etc.). In one example, each sub-file system may wait until it runs out of inode numbers before requesting more. In another example, the sub-file systems request more inodes when the number of their unused inodes drops below a threshold (e.g., 40%, 50%, etc.). In one embodiment, each sub-file system must track the inode numbers that have been assigned to it and the numbers that are currently used by executing applications.

In one embodiment, the TopFS may query the inode manager processor 510 to learn which sub-file system has consumed how many inodes. In particular, if a sub-file system has too many used inodes (e.g., a particular proportion of unused as compared to used inodes), then the files and directories from that sub-file system may be migrated by the inode balancing processor 530 to another sub-file system or a portion of its data (along with the name space and inode space) may be moved to another sub-file system without having to handle inode collisions.

Figure 6:
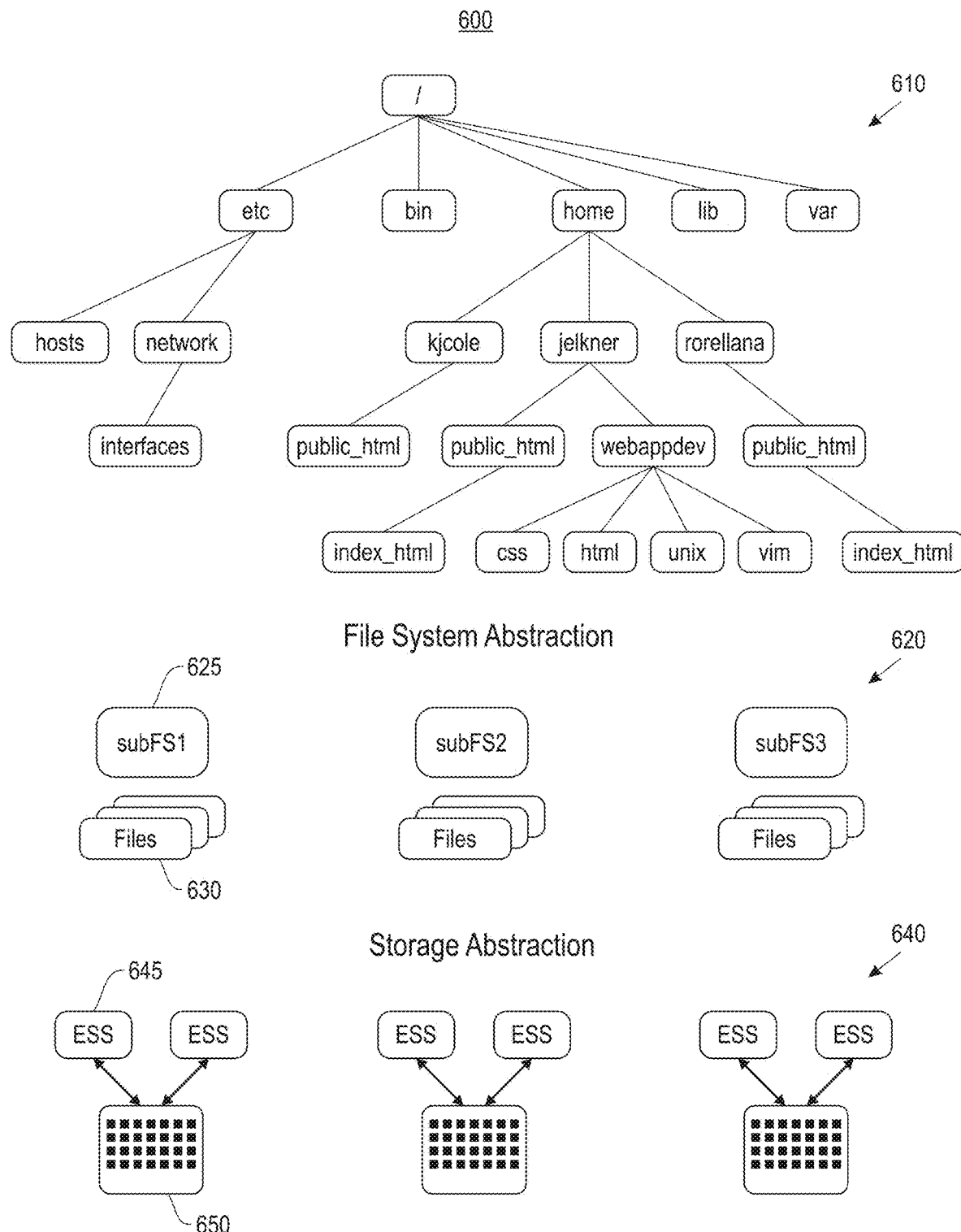
FIG. 6 illustrates a high-level file system structure, according to an embodiment.

FIG. 6 illustrates a high-level file system structure 600, according to an embodiment. In one embodiment, the file system structure 600 is a union mounted or aggregated file system having a TopFS 610 where a user views a single namespace. The file system abstraction 620 includes the sub-file systems 625 (e.g., subFS1, subFS2, subFS3, etc.) including files 630 and possibly directories, which are mapped across failure domains (sub-file systems 625) based upon policy. The storage abstraction 640 includes failure domains (sub-file systems mapped across storage building blocks and include elastic system servers (ESS) 645 and storage devices 650 (e.g., drives, discs, RAIDs, etc.). In one embodiment, a sub-file system in a first environment may be configured as a top-file system in a second environment wherein it maintains a directory structure of sub-file systems under its control.

In one embodiment, the TopFS 610 maintains the hierarchical directory structure and does not house data. The sub-file systems 625 have a two level namespace of directories and its files. The namespace in the TopFS 610 and pointers to sub-file systems 625 include the name of a directory in a sub-file system 625 that is its inode number in the TopFS 610. When a user looks up a directory, the system follows the pointer from the TopFS 610 directory to the sub-file system 625, and then finds and reads the directory with the name of its inode number.

In one embodiment, a policy-based directory creation in the file system structure 600 provides a capacity policy with no failure isolation where directories are allocated across all sub-file systems 625 using a round robin technique, based on available space, etc. In one embodiment, the file system structure 600 provides a dataset affinity policy with a per-dataset failure isolation that places an entire dataset in a single sub-file system 625, limits datasets to the size of a sub-file system 625, and where failure will not impact some projects but will impact others.

In one or more embodiments, the file system structure 600 provides fault tolerance where datasets in a single failure domain can survive a failure of any other domain, the TopFS 610 is relatively small and can recover quickly, users are provided the option to choose between capacity and availability by spreading a single dataset across all failure domains, which increases capacity while decreasing availability, and a single dataset is isolated within a single failure domain for increasing availability while reducing capacity.

The file system structure 600 provides fault tolerance for software where each sub-file system 625 can fail and recover independently without impacting other sub-file systems 625, and for hardware where each sub-file system 625 is mapped to storage building blocks according to performance, capacity, and availability requirements.

In one embodiment, the file system structure 600 provides performance benefits by parallelizing operations by issuing operations on any number of sub-file systems 625 simultaneously, depending on configured sub-file systems 625, where performance may be independent of the number of sub-file systems 625 (a sub-file system 625 may span all disks). Single sub-file system 625 improvements help the entire file system structure 600, and there are no performance losses for most operations.

In one embodiment, the file system structure 600 provides a capacity benefit where sub-file system 625 metadata managed separately, allowing metadata to scale with the number of sub-file systems 625, sub-file systems 625 are large enough to support most datasets (e.g., 1 to 10 PB in capacity), and to find files, the file system structure 600 only needs to scan an individual failure domain instead of the entire system.

One or more embodiments provide for the TopFS 610 storing a directory hierarchy, with each directory pointing to a sub-file system 625 for its directory contents. Upon directory creation, the directory is created in the TopFS 610, and then a directory (named with the inode number of the directory in the TopFS 610) is created in a sub-file system 625, and a symbolic pointer from the directory in the TopFS 610 points to the sub-file system 625. The sub-file system 625 in which the directory is created is chosen according to a policy. Each directory is stored at the root of the sub-file system 625 (flat namespace). Each directory in the sub-file system 625 is named using the inode number of the directory that points to it. Upon access of a directory in the TopFS 610, the file system structure 600 follows the pointer to the sub-file system, then access the information stored in the directory with its inode number. Upon access of a file in a directory, the TopFS 610 passes the requests to the file 630 in the sub-file system 625. In one embodiment, subsequent accesses to the file in the directory do not utilize the TopFS 610 an instead go directory to the file in the given sub-file system 625 previously accessed.

Figure 7:
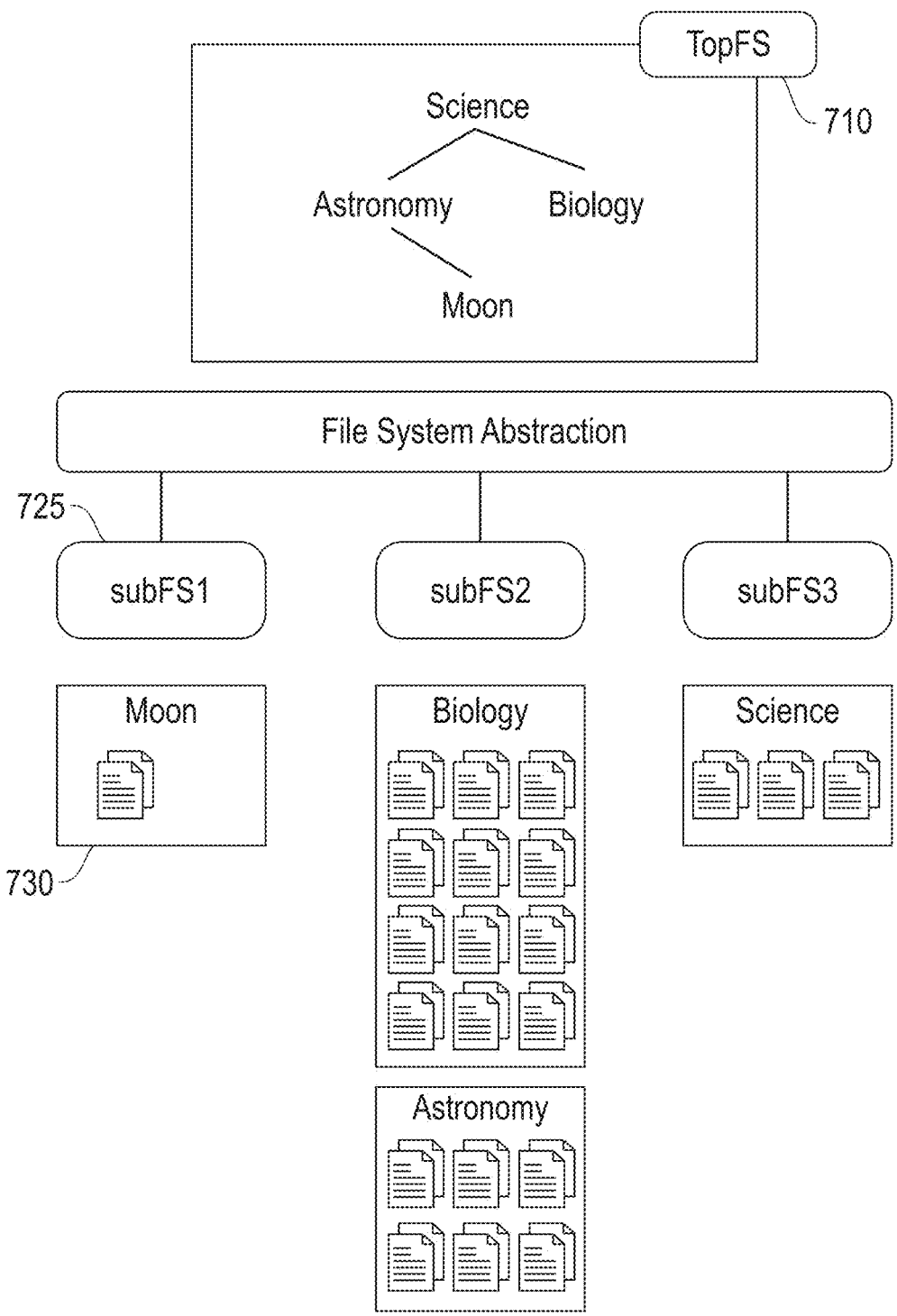
FIG. 7 is a block diagram illustrating an example of a file system including a top-file system portion and sub-file systems, according to an embodiment.

FIG. 7 is a block diagram illustrating an example of a file system including the TopFS 710 portion and sub-file systems 725 with directories 730, according to an embodiment. In this example, it is shown how the directories Science, Astronomy, Biology and Moon may be structured in the system.

Figure 8:
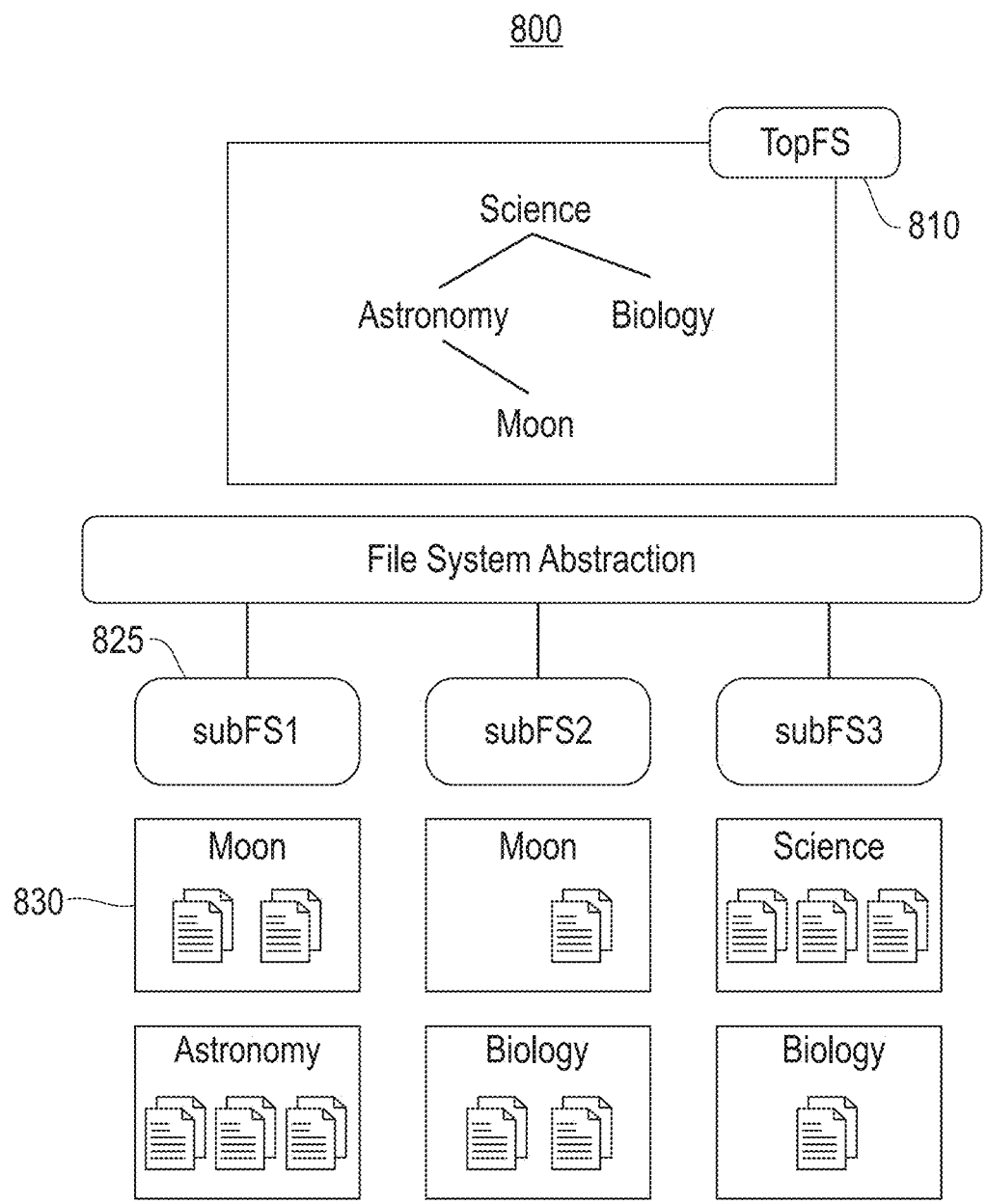
FIG. 8 is a block diagram illustrating an example of an alternative file system including a top-file system portion and sub-file systems, according to an embodiment.

FIG. 8 is a block diagram illustrating an example of an alternative file system including the TopFS 810 portion and sub-file systems 825 with directories 830, according to an embodiment. In this example, it is shown how the directories Science, Astronomy, Biology and Moon may be structured in the system and may further span across multiple sub-file systems 825. In one embodiment, the number of files in a directory, and the size of each file, is not known in advance so distributing directories across sub-file systems can lead to imbalance where some directories have many files and others have few or none. Further, storing all of a directory's files in a single sub-file system can limit performance to only that can be achieved by that single sub-file system. Moreover, as a directory grows, the sub-file system in which it exists can run out of capacity, leading to a 'out-of space' error even though capacity exists in other sub-file systems. Other issues to consider are renaming a file in a directory in one SubFS, to a directory in another subFS, may cause the file and all its data to be moved to the target subFS, causing lots of data movement and delay. Also, creating a hard link from a directory in one subFS, to a directory in another subFS may prove impossible.

In one embodiment, directories 830 are allowed to span across multiple SubFSs 825. In this embodiment, from the directory in the topFS 810, to find all of the directories 830 in the subFS 825 of which it is composed, the directory in the topFS 810 has several pointers, one to each subFS 825 which has a directory 830 that contains a subset of that directory's files (e.g., Moon directory residing in SubFS1 and SubFS2). Alternatively, the directory in the topFS 810 continues to have a single pointer to a subFS 825, and from that subFS, a chain is created (a series of pointers) to each of the SubFSs that contain directories 830 that contain a subset of that directory's files.

In one embodiment, the system 800 provides for dataset affinity which limits per-dataset failure isolation by placing data in a single SubFS while full SubFSs can "overflow" into additional SubFSs. In one embodiment, the system 800 provides for performance gains which limits per-dataset failure isolation by placing files (even in a single directory) across multiple SubFSs to avoid per-file system bottlenecks by parallelizing all operations (e.g., create, move, search, etc.).

In one or more embodiments, upon file creation, the system 800 checks if the space left in the existing subFS 825 is less than some predetermined threshold. If the available space is below the threshold, the system 800 checks other subFSs 825 if they have a greater amount of available capacity. If another subFS has space (greater than the threshold), the system 800 creates the file in subFS with the extra available space. In one embodiment, when checking other subFSs, the system 800 first checks the SubFSs in which the directory already exists. For example, if SubFS1's space falls below the threshold and a file in the Moon directory is to be created, the system first checks SubFS2 for available space because SubFS2 already contains a portion of the Moon directory. If SubFS2 does not have the available space, the system 800 searches other SubFSs that do not have portions of the directory. If no subFS can be found, then the system 800 "reports out of space."

In one or more embodiments, when extending the size of an existing file, and the current SubFS's space is below the threshold, the system 800 may move the entire contents of the file to another SubFS 825 that has space and continue extending the file. In one embodiment, the system 800 can create pointer from the current subFS for the file to another subFS. The current subFS maintains the byte ranges that fit for the file, and the pointer points to the other subFS which has the remaining byte ranges. In one embodiment, the system 800 creates a space allocation map (e.g., xattr or new file) for the file, in either the subFS 825 or topFS 810, that has the locations of all byte-ranges for the file across all the subFSs. The file is then extended as needed across all the subFSs 825.

In one embodiment, if a file is renamed from a source directory in one subFS, to a target directory in another subFS and the target directory already exists in the source subFS, then the rename the file into the target directory on the source SubFS. In one embodiment, if the target directory 830 does not exist in the source SubFS 825, the system 800 creates the target directory in the source SubFS, creates a link (e.g., symbolic link, hard link, etc.) for target directory in the SubFS and renames the file into the target directory 830 in the source SubFS 825.

In one embodiment, if a link is created in a target directory 830 in one subFS 825, to a source directory in another subFS, and the target directory already exists in the source SubFS, the system 800 creates the link to the source directory. In one embodiment, if the target directory does not exist in the source SubFS, the system 800 creates the target directory in the source SubFS, creates a link (e.g., hard link) for the target directory and creates a link in the target directory in the source SubFS.

Figure 9:
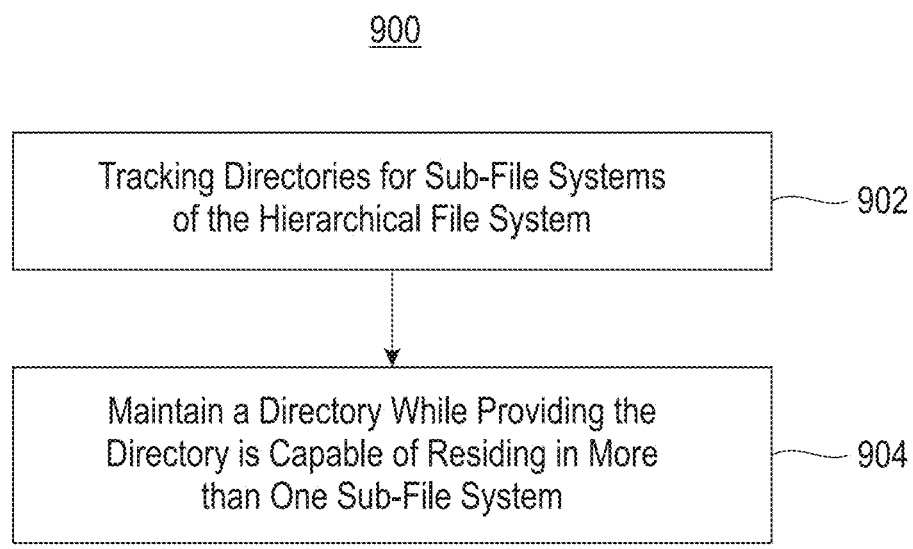
FIG. 9 illustrates a block diagram for a process for storage management in a hierarchical file system, according to one embodiment.

FIG. 9 illustrates a block diagram for a process 900 for storage management in a hierarchical file system (e.g., file system structure 600, 700 or 800, see FIGS. 6-8), according to one embodiment. In block 902 process 900 includes tracking directories for sub-file systems (e.g., sub-file systems 625, FIG. 6, 725, FIG. 7, 825, FIG. 8) of the hierarchical set of file systems. In one embodiment, tracking comprises maintaining a set of corresponding directories in the top-file system (810, FIG. 8), each directory corresponding to a unique directory among the sub-file systems (825, FIG. 8). In one embodiment, tracking further comprises maintaining in each of the corresponding directories in the top-file system, a symbolic pointer which points from the corresponding directory to the given sub-file system where the first portion of the tracked directory resides. For example, in this embodiment, TopFS (810, FIG. 8) would maintain a corresponding directory for the Moon directory and have but a single symbolic pointer which points to SubFS1 (825, FIG. 8) if the Moon directory (830, FIG. 8) residing there is the first portion of the Moon directory. In one embodiment, a number of symbolic pointers are in the corresponding directory each of which points to a sub-file system where a portion of the tracked directory resides. For example, in this embodiment, the TopFS (810, FIG. 8) would maintain a corresponding directory for the Moon directory, the corresponding directory would contain two symbolic pointers, one to SubFS1 and the other to SubFS2 (825, FIG. 8), given the Moon directory spans both sub-file systems.

In block 904 the process 900 maintains a directory while providing the directory is capable of residing in more than one sub-file system. In one embodiment, if available space in a first sub-file system is below a threshold, the process 900 identifies a second sub-file system with available space above the threshold, wherein the first sub-file system contains a first portion of the directory. In one embodiment, if a second portion of the directory exists in the second sub-file system, the process 900 creates a file in the second portion of the directory. In one embodiment, if a second portion of the directory does not exist in the second sub-file system, the system creates the second portion of the directory in the second sub-file system, creates a link from the first portion of the directory to the second portion of the directory and creates the file in the second portion of the directory.

In one embodiment, if a second portion of the directory exists in the second sub-file system, the process 900 can move a file into the second portion of the directory. In one or more embodiments, if a second portion of the directory does not exist in the second sub-file system, the process 900 creates the second portion of the directory in the second sub-file system, then creates a link from the first portion of the directory to the second portion of the directory and moves the file into the second portion of the directory.

In one embodiment, if a second portion of the directory exists in the second sub-file system, the process 900 creates a pointer for a file which points from the first portion of the directory to the second portion of the directory, wherein an extended part of a file resides in the second portion of the directory. In one embodiment, if a second portion of the directory does not exist in the second sub-file system, the process 900 creates the second portion of the directory in the second sub-file system, creates a link from the first portion of the directory to the second portion of the directory and creates a pointer for the file which points from the first portion of the directory to the second portion of the directory, wherein an extended part of the file resides in the second portion of the directory.

In one embodiment, process 900 checks available space in sub-file systems that contain a portion of the directory and then checks available space in sub-file systems that do not contain a portion of the directory. In one or more embodiments, for each directory in a sub-file system, the process 900 maintains a corresponding directory in a top-file system; and maintains a symbolic pointer in the corresponding directory which points from the corresponding directory the sub-file system where a first portion of the tracked directory resides. In one embodiment, for each directory in a sub-file system, the process 900 maintains a corresponding directory in a top-file system; and maintains a number of symbolic pointers in the corresponding directory where each pointer points from the corresponding directory to a distinct sub-file system where any portion of the tracked directory resides.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for storage management in a hierarchical set of file systems, the method comprising:
   creating a structure for the hierarchical set of file systems including a top-file system and sub-file systems that each include files and directories;
   tracking directories for the sub-file systems of the hierarchical set of file systems;
   maintaining a directory while providing the directory is capable of residing in more than one sub-file system;
   for each directory in the hierarchical set of file systems:
      maintaining a corresponding directory in the top-file system; and
      maintaining a number of symbolic pointers in the corresponding directory which each point from the corresponding directory to a sub-file system where any portion of the tracked directory resides; and
   upon a request by a particular sub-file system for more inodes without any inodes available, revoking inode numbers from at least one other sub-file system having unused inodes;
   wherein per-dataset failure isolation is limited by placement of files across multiple sub-file systems, and each directory in the sub-file systems is named using an inode number of a directory in the top file system.

2. The method of claim 1, further comprising:
   creating a sub-file system of the hierarchical set of file systems based on applying a directory creation policy;
   wherein:
      maintaining comprises:
         if available space in a first sub-file system is below a threshold, identifying a second sub-file system with available space above the threshold, wherein the first sub-file system contains a first portion of the directory; and
      a namespace in the top file system and pointers to each of the multiple sub-file systems include a name of a directory in a sub-file system that is its inode number in the top file system portion.

3. The method of claim 2, further comprising:
   if a second portion of the directory exists in the second sub-file system, creating a file in the second portion of the directory; and
   parallelizing file system operations by issuing the file system operations on any number of sub-file systems simultaneously.

4. The method of claim 3, further comprising:
   if a second portion of the directory does not exist in the second sub-file system:
      creating the second portion of the directory in the second sub-file system;
      creating the file in the second portion of the directory; and
      creating a symbolic link from a corresponding directory in the top-file system to the second sub-file system, wherein the corresponding directory relates to the first portion of the directory.

5. The method of claim 2, further comprising:
   if a second portion of the directory exists in the second sub-file system, moving a file into the second portion of the directory.

6. The method of claim 5, further comprising:
   if a second portion of the directory does not exist in the second sub-file system:
      creating the second portion of the directory in the second sub-file system;
      moving the file into the second portion of the directory; and
      creating a symbolic link from a corresponding directory in the top-file system to the second sub-file system, wherein the corresponding directory relates to the first portion of the directory.

7. The method of claim 2, further comprising:
   if a second portion of the directory exists in the second sub-file system, creating a pointer for a file which points from the first portion of the directory to the second portion of the directory, wherein an extended part of a file resides in the second portion of the directory.

8. The method of claim 7, further comprising:
   if a second portion of the directory does not exist in the second sub-file system:
      creating the second portion of the directory in the second sub-file system;
      creating a link from the first portion of the directory to the second portion of the directory; and
      creating a pointer for the file which points from the first portion of the directory to the second portion of the directory, wherein an extended part of the file resides in the second portion of the directory.

9. The method of claim 2, wherein:
   identifying comprises:
      checking available space in sub-file systems that contain a portion of the directory; and
      then checking available space in sub-file systems that do not contain a portion of the directory;
   the sub-file systems are mapped across storage building blocks and include elastic file servers and storage devices; and
   create, move and search operations performed on the sub-file systems are parallelized.

10. A computer program product for storage management in a hierarchical set of file systems, the computer program product comprising a computer readable storage medium having program instructions embodied therewith, the program instructions executable by a processor to cause the processor to:
   create, by the processor, a structure for the hierarchical set of file systems including a top-file system and sub-file systems that each include files and directories;
   track, by the processor, directories for the sub-file systems of the hierarchical set of file systems;
   maintain, by the processor, a directory while providing the directory is capable of residing in more than one sub-file system;
   for each directory in the hierarchical set of file systems:
      maintain, by the processor, a corresponding directory in the top-file system; and
      maintain, by the processor, a number of symbolic pointers in the corresponding directory which each point from the corresponding directory to a sub-file system where any portion of the tracked directory resides; and upon a request by a particular sub-file system for more inodes without any inodes available, revoke, by the processor, inode numbers from at least one other sub-file system having unused inodes;

wherein per-dataset failure isolation is limited by placement of files across multiple sub-file systems, and each directory in the sub-file systems is named using an inode number of a directory in the top file system.

11. The computer program product of claim 10, further comprising program instructions executable by the processor to cause the processor to:

create, by the processor, a sub-file system of the hierarchical set of file systems based on applying a directory creation policy; and if available space in a first sub-file system is below a threshold, identify, by the processor a second sub-file system with available space above the threshold, wherein the first sub-file system contains a first portion of the directory;

wherein a namespace in the top file system and pointers to each of the multiple sub-file systems include a name of a directory in a sub-file system that is its inode number in the top file system portion.

12. The computer program product of claim 11, further comprising program instructions executable by the processor to cause the processor to:

if a second portion of the directory exists in the second sub-file system, create, by the processor, a file in the second portion of the directory; and parallelize, by the processor, file system operations by issuing the file system operations on any number of sub-file systems simultaneously.

13. The computer program product of claim 12, further comprising program instructions executable by the processor to cause the processor to:

if a second portion of the directory does not exist in the second sub-file system:

create, by the processor, the second portion of the directory in the second sub-file system;

create, by the processor, the file in the second portion of the directory; and create, by the processor, a pointer for the file which points from the first portion of the directory to the second portion of the directory, wherein an extended part of the file resides in the second portion of the directory.

14. The computer program product of claim 11, further comprising program instructions executable by the processor to cause the processor to:

if a second portion of the directory exists in the second sub-file system, move, by the processor, a file into the second portion of the directory.

15. The computer program product of claim 14, further comprising program instructions executable by the processor to cause the processor to s:

if a second portion of the directory does not exist in the second sub-file system:

create, by the processor, the second portion of the directory in the second sub-file system;

move, by the processor, the file into the second portion of the directory; and create, by the processor, a pointer for the file which points from the first portion of the directory to the second portion of the directory, wherein an extended part of the file resides in the second portion of the directory.

16. The computer program product of claim 11, further comprising program instructions executable by the processor to cause the processor to:

if a second portion of the directory exists in the second sub-file system:

create, by the processor, a pointer for a file which points from the first portion of the directory to the second portion of the directory, wherein an extended part of the file resides in the second portion of the directory.

17. The computer program product of claim 16, further comprising program instructions executable by the processor to cause the processor to:

if a second portion of the directory does not exist in the second sub-file system:

create, by the processor, the second portion of the directory in the second sub-file system; and create, by the processor, a pointer for the file which points from the first portion of the directory to the second portion of the directory, wherein an extended part of the file resides in the second portion of the directory.

18. The computer program product of claim 11, further comprising program instructions executable by the processor to cause the processor to:

check, by the processor, available space in sub-file systems that contain a portion of the directory; and then check, by the processor, available space in sub-file systems that do not contain a portion of the directory; wherein:

the sub-file systems are mapped across storage building blocks and include elastic file servers and storage devices; and create, move and search operations performed on the sub-file systems are parallelized.

19. An apparatus comprising:

a memory storing instructions; and one or more processors executing the instructions to:

create a structure for a hierarchical set of file systems including a top-file system and sub-file systems that each include files and directories;

track directories for the sub-file systems of the hierarchical set of file systems;

maintain a directory while providing the directory is capable of residing in more than one sub-file system; and upon a request by a particular sub-file system for more inodes without any inodes available, revoke inode numbers from at least one other sub-file system having unused inodes;

wherein per-dataset failure isolation is limited by placement of files across multiple sub-file systems, and each directory in the sub-file systems is named using an inode number of a directory in the top file system.

20. The apparatus of claim 19, wherein for each directory in the hierarchical set of file systems the one or more processors further execute instructions to:

create a sub-file system of the hierarchical set of file systems based on applying a directory creation policy;

maintain a corresponding directory in a top-file system;

maintain a number of symbolic pointers in the corresponding directory which each point from the corresponding directory to a sub-file system where any portion of the tracked directory resides; and parallelize file system operations by issuing the file system operations on any number of sub-file systems simultaneously;

wherein:

the sub-file systems are mapped across storage building blocks and include elastic file servers and storage devices;

create, move and search operations performed on the sub-file systems are parallelized; and a namespace in the top file system and pointers to each of the multiple sub-file systems include a name of a directory in a sub-file system that is its inode number in the top file system portion.

\* \* \* \* \*